United States Patent
Kim et al.

(10) Patent No.: US 10,146,402 B2
(45) Date of Patent: Dec. 4, 2018

(54) USER TERMINAL DEVICE FOR DISPLAYING DIFFERENT CONTENT FOR AN APPLICATION BASED ON SELECTED SCREEN AND DISPLAY METHOD THEREOF

(71) Applicant: Samsung Electronics Co. Ltd., Suwon-si, Gyeonggi-do (KR)

(72) Inventors: Sin-ae Kim, Seoul (KR); Nam-wook Kang, Seoul (KR); Young-sun Kim, Suwon-si (KR); Jong-hyun Ryu, Daejeon (KR); Seung-eok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/031,333

(22) Filed: Sep. 19, 2013

(65) Prior Publication Data

US 2014/0082563 A1    Mar. 20, 2014

(30) Foreign Application Priority Data

Sep. 20, 2012 (KR) .......................... 10-2012-0104742

(51) Int. Cl.
| | | |
|---|---|---|
| *G06F 3/0482* | (2013.01) | |
| *H04M 1/725* | (2006.01) | |
| *G06F 3/0488* | (2013.01) | |
| *G06F 3/0481* | (2013.01) | |
| *G06F 9/451* | (2018.01) | |

(52) U.S. Cl.
CPC .......... *G06F 3/0482* (2013.01); *G06F 3/0481* (2013.01); *G06F 3/0488* (2013.01); *G06F 9/451* (2018.02); *H04M 1/72519* (2013.01); *H04M 1/72583* (2013.01)

(58) Field of Classification Search
CPC .... G06F 9/4443; G06F 9/451; H04N 5/44543
USPC ....................................................... 715/835
See application file for complete search history.

(56) References Cited

U.S. PATENT DOCUMENTS

| | | |
|---|---|---|
| 8,958,851 B2 | 2/2015 | Kim et al. |
| 8,988,353 B2 | 3/2015 | Shin et al. |
| 10,025,480 B2 | 7/2018 | Shin et al. |
| 2010/0295789 A1 | 11/2010 | Shin et al. |
| 2010/0299598 A1 | 11/2010 | Shin et al. |
| 2011/0060994 A1 | 3/2011 | Maxwell et al. |

(Continued)

FOREIGN PATENT DOCUMENTS

| | | |
|---|---|---|
| CN | 101548531 A | 9/2009 |
| CN | 102572092 A | 7/2012 |

(Continued)

*Primary Examiner* — Joy M Weber
(74) *Attorney, Agent, or Firm* — Jefferson IP Law, LLP

(57) ABSTRACT

A user terminal device including a screen processor which creates home screen divided into a plurality of spaces provided with different features from each other, a storage which stores data and programs that can be matched with at least one space, a display which displays one space from among the plurality of spaces, and a controller which controls the display to convert the space displayed on the display to another space according to a user's manipulation is provided. The controller controls the screen processor to constitute the plurality of spaces by using data and programs matched with the plurality of spaces, respectively.

18 Claims, 16 Drawing Sheets

(56) References Cited

U.S. PATENT DOCUMENTS

| | | |
|---|---|---|
| 2012/0071208 A1 | 3/2012 | Lee et al. |
| 2012/0079432 A1 | 3/2012 | Lee et al. |
| 2012/0165075 A1* | 6/2012 | Kim ................... G06F 9/4443 455/566 |
| 2012/0169768 A1 | 7/2012 | Roth et al. |
| 2013/0091462 A1* | 4/2013 | Gray et al. ................ 715/810 |
| 2013/0326557 A1* | 12/2013 | Kang ................... G06F 3/0482 725/42 |
| 2014/0250390 A1* | 9/2014 | Holmes ............... G06F 9/4443 715/760 |
| 2015/0169211 A1 | 6/2015 | Shin et al. |

FOREIGN PATENT DOCUMENTS

| | | |
|---|---|---|
| EP | 2 306 307 A2 | 4/2011 |
| EP | 2 472 378 A2 | 7/2012 |
| KR | 10-2010-0124427 A | 11/2010 |
| KR | 10-2012-0009843 A | 2/2012 |
| KR | 10-2012-0029723 A | 3/2012 |
| KR | 10-2012-0035772 A | 4/2012 |

* cited by examiner

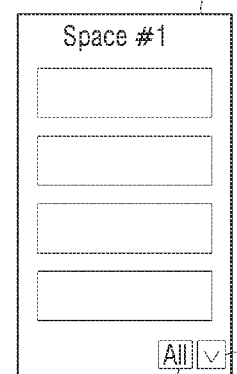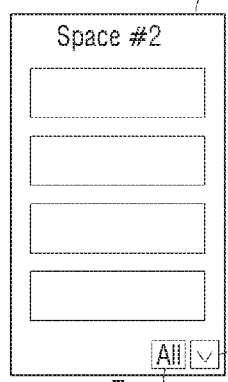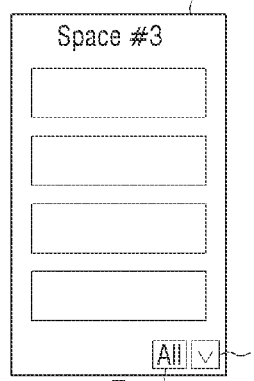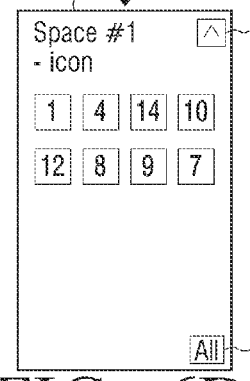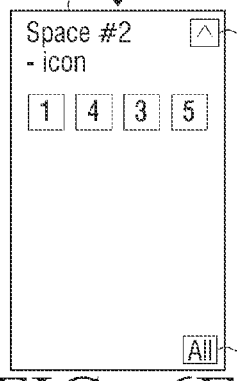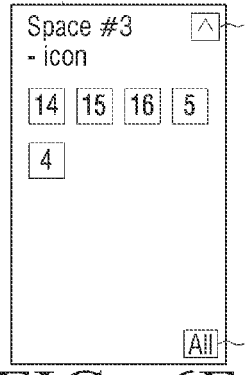

USER TERMINAL DEVICE FOR DISPLAYING DIFFERENT CONTENT FOR AN APPLICATION BASED ON SELECTED SCREEN AND DISPLAY METHOD THEREOF

CROSS-REFERENCE TO RELATED APPLICATION(S)

This application claims the benefit under 35 U.S.C. § 119(a) of a Korean patent application filed on Sep. 20, 2012, in the Korean Intellectual Property Office and assigned Serial No. 10-2012-0104742, the entire disclosure of which is hereby incorporated by reference.

TECHNICAL FIELD

The present disclosure relates to a user terminal device and a display method thereof. More particularly, the present disclosure relates to a user terminal device configured to display a home screen including a plurality of spaces, and a display method thereof.

BACKGROUND

Supported by the advanced electronic technology, various types of user terminal devices have been developed. Recently, users have been enabled to arbitrarily install and use applications on user terminal devices.

When applications are installed, icons are displayed on the screen of a user terminal device. A user can arbitrarily move and use icons of the applications which he or she installs to a home screen. Specifically, a user may design a home screen using widgets or applications. That is, a user can arrange a home screen by using widgets or applications to include icons selected and positioned according to the user's desires.

However, since constitution of the home screen is unified in related user terminal devices, there is a limitation in creating and using the home screen.

Thus, a technology is necessary, which can create and display home screen in more various formats.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

An aspect of the present disclosure is to provide a technical objective for a user terminal device configured to create a home screen including a plurality of spaces which are provided with different features from each other, to display the created home screen, and a display method thereof.

In accordance with an aspect of the present disclosure, a user terminal device is provided. The user terminal device includes a screen processor configured to generate a home screen divided into a plurality of spaces provided with different features from each other, a storage configured to store data and programs that can be matched with at least one of the spaces, a display configured to display one space from among the plurality of spaces, and a controller configured to control the display so that the space displayed on the display is converted into another space according to a user's manipulation. The controller controls the screen processor to constitute the plurality of spaces using data and programs that can be matched in each space among the plurality of spaces.

The controller may divide and independently manage setting values and data, which are established regarding programs corresponding to the features of the plurality of spaces, according to features of each space.

The space may include an implementing screen page and an icon display page, and the implementing screen page may comprise at least one panel area indicating widget of at least one program corresponding to the space features or an implementing result screen, and the icon display page may display an icon of at least one program.

When an icon is selected on the icon display pages, the controller may add a new panel area to the implementing screen page by implementing a program corresponding to the selected icon.

The implementing screen page and the icon display page may each include a page converting menu to convert pages, and the controller may mutually convert the implementing screen page and the icon display page whenever the page converting menu is selected.

At least one page among the implementing screen page and the icon display page may include a screen converting menu to convert into an icon screen indicating whole icons corresponding to all the programs respectively, and the controller may control the screen processor to complete the home screen, generate the icon screen, and provide these to the display, when the screen converting menu is selected.

When an icon is selected within the icon screen and a user manipulation to match the icon with one space among the plurality of spaces is made, the controller may display the icon on an icon display page within the selected space.

When one program is commonly matched with the plurality of spaces, the controller may independently manage implementing records of the program per space, and independently manage implementing screen of each program per space.

The features may include at least one of a personal property which a user of the user terminal device exclusively uses, a social property which a user uses with at least one other user, and a manager property which is managed by a designated manager.

The controller may display an implementing screen of a program, among programs of the user terminal device, that is matched with the space given with the social property, and also an implementing screen of a program that is provided from at least one other user on an implementing screen page of the space given with the social property, and the controller may display an icon of a program matched with the space given with the social property among the programs of the user terminal device and an icon of a program provided from at least one other user on icon display pages of the space given with the social property.

In accordance with another aspect of the present disclosure, a display method of a user terminal device is provided. The display method includes creating a home screen divided into a plurality of spaces given with different features to each other, displaying one space from among the plurality of spaces, and converting the displayed space into other space according to a user's manipulation. The plurality of spaces may include matched data and programs per space.

Setting values and data established regarding programs corresponding to the plurality of spaces may be divided according to the features of each space and independently managed.

The space may include an implementing screen page and an icon display page, the implementing screen page may display at least one panel area indicating widget of at least one program corresponding to the space features or an implementing result screen, and the icon display page may display an icon of at least one program.

The display method may additionally include adding a new panel area to the implementing screen page by implementing a program corresponding to the selected icon, when one icon is selected on the icon display page.

The implementing screen page and the icon display page may respectively include a page converting menu to convert pages, and the implementing screen page and the icon display page may mutually be converted and displayed whenever the page converting menu is selected.

At least one page among the implementing screen page and the icon display page may include a screen converting menu to convert into an icon screen indicating whole icons corresponding to all the programs respectively, and the display method may additionally include completing the home screen and generating and displaying the icon screen when the screen converting menu is selected.

The display method may additionally include, when one icon is selected within the icon screen and a user manipulation to match the icon with one space from among the plurality of spaces is made, displaying the icon on an icon display page within the selected space.

The display method may additionally include independently managing implementing records of the program per space when one program is commonly matched with the plurality of spaces, and independently displaying an implementing screen of each program per space.

The features may include at least one of a personal property which a user of the user terminal device exclusively uses, a social property which a user uses with at least one other user, and a manager property which is managed by a designated manager.

An implementing screen page of the space given with the social property may display an implementing screen of a program, among programs of the user terminal device, that is matched with the space given with the social property, and also an implementing screen of a program that is provided from at least one other users, and an icon display page of the space given with the social property may display an icon of a program, among programs of the user terminal device, that is matched with the space given with the social property, and also an icon of a program provided from at least one other user.

According to the above various embodiments, various features of spaces may be constituted and displayed. Therefore, programs and data can be independently used according to the features of each space.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 6D, 6E, 6F, and 6G are views provided to illustrate a process of converting screens in the user terminal device according to an embodiment of the present disclosure;

Throughout the drawings, it should be noted that like reference numbers are used to depict the same or similar elements, features, and structures

DETAILED DESCRIPTION

Figure 1:
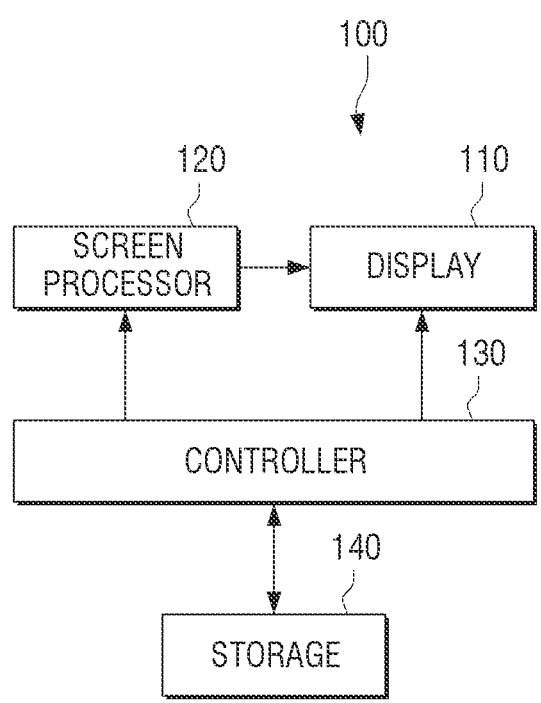
FIG. 1 is a block diagram of a user terminal device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness, The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, same drawing reference numerals are used for the same elements even in different drawings. The matters defined in the description, such as detailed construction and elements, are provided to assist in a comprehensive understanding of the present disclosure. Accordingly, it is apparent that the various embodiments of the present disclosure can be carried out without those specifically defined matters. Also, well-known functions or constructions are not described in detail since they would obscure the disclosure with unnecessary detail.

FIG. 1 illustrates a constitution of a user terminal device according to an embodiment of the present disclosure. The user terminal device 100 may be implemented as various types of devices such as a Personal Digital Assistant (PDA), electronic frame, electronic book, electronic notepad, Motion Picture Experts Group (MPEG)-2 Audio Layer III (MP3) player, tablet Personal Computer (PC), laptop computer, monitor, kiosk, or table PC.

Referring to FIG. 1, the user terminal device 100 includes a display 110, a screen processor 120, a controller 130, and a storage 140.

The display 110 is configured to display various screens. Specifically, the display 110 may display various screens such as a home screen, an icon display screen to display various applications installed on the user terminal device 100 and icons regarding folders, an application screen created by implementing various applications, and a lock-on screen to inform the user of a lock-on status. The home screen is the most basic screen. Differently named, it may alternatively be called a background screen, main screen, or base screen.

The display 110 may include various types of display panels such as a Liquid Crystal Display (LCD), an Organic Light-Emitting Diode (OLED), an ElectroPhorectic Display (EPD), an ElectroChromic Display (ECD), and a Plasma Display Panel (PDP).

When implemented as the LCD, the display 110 may further include a liquid crystal layer, a transistor layer, and a backlight unit. The liquid crystal layer is divided into a plurality of liquid crystal cells. The transistor layer includes a plurality of transistors corresponding to the liquid crystal cells, respectively. The transistor may be implemented as an amorphous Silicon (a-Si) Thin Film Transistor (TFT), a Low Temperature Poly Silicon (LTPS) TFT, and an Organic TFT (OTFT). Each transistor activates the connected liquid crystal cell when electrical signals are applied. The backlight unit provides backlights toward the liquid crystal layer direction by placing a light source such as a lamp or LED in a direct-lit or edge-lit arrangement. A color filter layer may be further included.

The screen processor 120 is configured to create various screens to be displayed on the display 110. As described above, screens may be implemented variously. Among the screens, home screen may be divided into a plurality of spaces. The 'space' as used herein refers to a basic unit to divide a home screen. One space may be created on the basis of at least one screen page unit.

The screen processor 120 creates the home screen which is divided into a plurality of spaces provided with different features from each other. As used herein, the 'feature(s)' may be divided into a personal property, a social property, and a manager property based on access authorization regarding the corresponding space. The 'personal property' indicates features of a space where programs and data that can be exclusively used by a specific user of the user terminal device are provided. The 'social property' refers to the features of a space where programs and data are commonly used with at least one other user. The 'manager property' refers to features in which programs and data are managed by a designated manager.

Further, the features may be divided based on places. For example, the personal property may be classified into a space property used at home, a space property used at an office or school, and a space property used at a fitness center or private teaching institution. The 'social property' or 'manager property' may be also classified in more detail according to places.

Features may be divided based on various standards, such as a user status standard and a time slot standard.

The screen processor 120 may provide a plurality of spaces to the display 110. The display 110 displays the provided space screens.

The storage 140 may store various programs and data. Such data and programs may be matched respectively with the spaces on home screen. The stored data may be received or generated during use of the user terminal device 100.

The controller 130 controls the screen processor 120 so as to constitute each space by using the matched data and programs with each of the plurality of spaces.

A user may input a converting command regarding the space screens, for example, by touching the displayed space screens or manipulating direction keys. The controller 130 converts the space screens of the display 110 into other space screens according to the converting command.

The controller 130 divides setting values and data regarding corresponding programs to features of the plurality of spaces according to the space features respectively, and manages them independently. For example, when setting values or data established for one program are matched with a plurality of spaces, the controller 130 independently stores setting values or data per each space of the plurality of spaces. Therefore, even if the implementing screen of one program is included in a plurality of spaces, descriptions of each implementing screen may be displayed differently.

Figure 2:
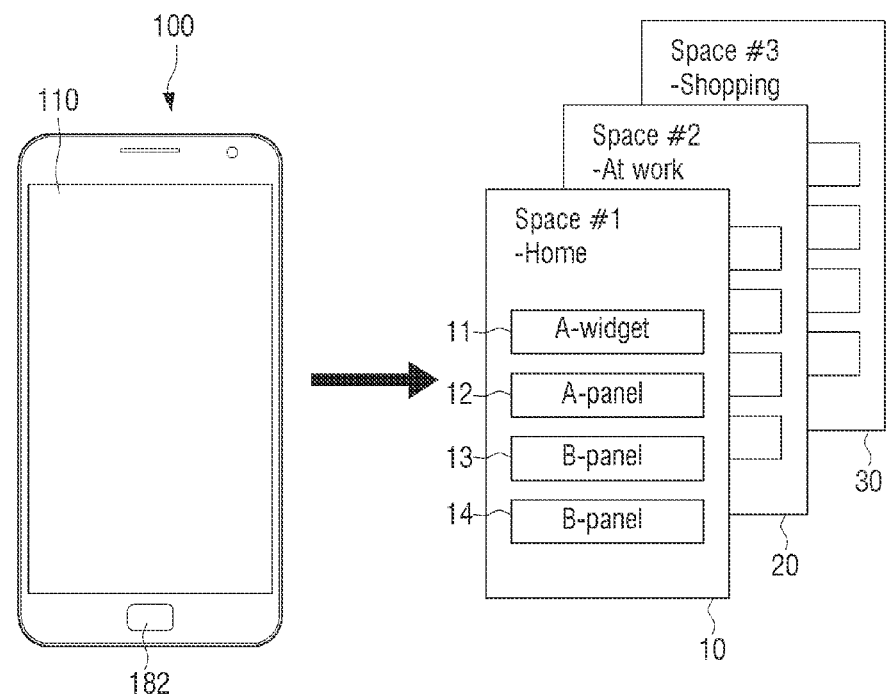
FIG. 2 illustrates a plurality of spaces which have different features from each other according to an embodiment of the present disclosure.

FIG. 2 illustrates an example of a home screen on the user terminal device according to an embodiment of the present disclosure.

Referring to FIG. 2, the user terminal device 100 provides a button 182. FIG. 2 illustrates that the button 182 is provided on a lower center of a bezel in the user terminal device 100; however, according to various embodiments, the present disclosure is not limited thereto and the button may be provided on various positions such as sides, an upper area, a lower left, or a lower right area of the bezel in the user terminal device 100. The button 182 may be called a home button. When the button 182 is selected, the controller 130 controls the display 110 to display a home screen.

The home screen includes a plurality of spaces. Referring to FIG. 2, three exemplary spaces 10, 20, and 30 are included in the home screen. Space #1 10 is a space provided with a personal property so that a user can use it at home, space #2 20 is a space provided with a personal property so that the user can use it at the workplace, and space #3 30 is a space provided with a personal property so that the user can use it at a shopping center.

On each of the spaces 10, 20, and 30, implementing results of the matched programs with the corresponding space are divided and displayed per area. Space #1 10 displays an exemplary panel area 11 where a widget screen of an 'A' program is displayed, a panel area 12 where implementing results of the 'A' program are displayed, and panel areas 13 and 14 where implementing results of a 'B' program are displayed. The size and number of the panel areas 11~14 may be variously determined according to the number of the matched programs with corresponding space. The panel area may be sorted based on a user logging of the programs. Each panel area may include, for example, recently-used applications, thumbnail images of extra programs, or widget components. When a panel area is selected, the controller 130 immediately implements a corresponding program to the panel area. Further, each program may provide a resume function to track a recently-implemented list per space as a default.

When a user manipulation to convert spaces is input while Space #1 10 is displayed, other Spaces #2 20 and #3 30 are displayed on the display 110 according to the manipulating direction.

As described above, features of each space may be established differently according to various standards. For convenient explanation, the following will specifically explain a constitution of each space in a case that Space #1 10 has a personal property, Space #2 20 has a social property, and Space #3 30 has a manager property.

Figure 3:
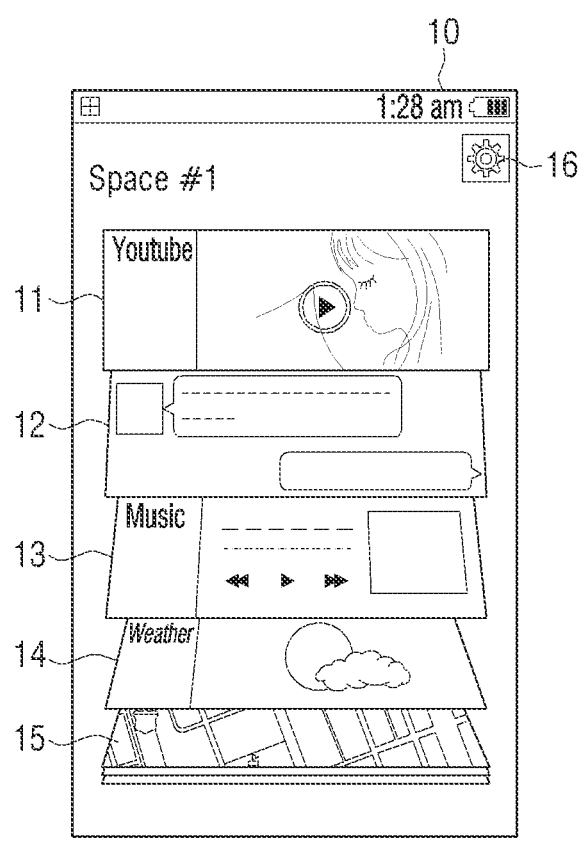
FIG. 3 illustrates an example of a constitution of a space provided with a personal property according to an embodiment of the present disclosure.

FIG. 3 illustrates an example of a constitution of Space #1 10 provided with a personal property according to an embodiment of the present disclosure.

Referring to FIG. 3, Space #1 10 displays a first panel area 11 where an implementing screen of a video playing program is displayed, a second panel area 12 where an implementing screen of a chat program is displayed, a third panel area 13 where an implementing screen of an audio contents playing program is displayed, a fourth panel area 14 where implementing results of a weather widget program are displayed, and a fifth panel area 15 where a map widget is displayed. Further, an area of Space #1 10 may display various menus. FIG. 3 illustrates a displaying situation in which a status information confirm menu 16 is displayed. When the status information confirm menu 16 is selected, it may display a screen which indicates various detail information regarding a status of Space #1 10. Examples of such screen constitution will be specifically described below.

Upon initializing, the user terminal device 100 implements programs matched with Space #1 10 and displays the implementing results respectively on the panel areas 11~15. A panel area may retain an activating status according to the implementing of corresponding programs. Thus, each panel area is continuously updated. For example, when there is a message newly input from a chat, the description of the second panel area 12 is modified. Further, when a playing menu is selected on the first panel area 11 or the third panel area 13, video contents or music contents may play immediately on corresponding areas 11 and 13, respectively.

Further, other panel areas than widgets may display captured images regarding program implementing screens. For example, the second panel area 12 may display captured screen images of previous chats with another user, and the first panel area 11 may display captured screen images of a last playing scene regarding video contents that were previously played. A user may confirm user logging information of the programs which were previously used through such panel areas.

User logging information may be managed independently according to the space features. For example, it is assumed that Space #1 10 has space features so as to be used at a personal home, Space #2 20 has space features so as to be used at a work office, and both of Spaces #1 10 and #2 20 are matched with the chat program. Under these circumstances, it is assumed that a user chats with another user A when at home and with another user B when at the office. Even if the user uses the same chatting program in both places, Space #1 10 displays a chat results screen with A and Space #2 20 displays a chat results screen with B. Data stored while implementing one program may be independently stored according to features of each space, and used per each space. Thus, a user may confirm user logging information of the programs per each space. As a result, the possibility to more fully use the home screen is expanded.

Although the above describes an example of using the chat program, the contents playing program can be used similarly. For example, audio contents which are frequently listened to when at home, audio contents which are listened to when at the office, and audio contents which are listened to while exercising may be different from each other. Thus, when the home space is selected, songs that a user personally favors may be played. When the office space is selected, MP3 files for foreign languages may be played. When the exercising space is selected, music having a fast rhythm appropriate for exercising may be played. Thus, a user may classify and create spaces per each place, and classify the contents according to the space features of each space. In this case, types of contents played on corresponding spaces may be automatically divided according to the classifying. For another example, a navigation program may provide first favorite information which is used while driving and second favorite information which is used while walking on the roads, divided and provided according to the respective spaces.

A user may select a proper space for his current status on the home screen, select an icon matched with the panel area or the space, and use programs and data according to the status.

Although FIG. 3 describes the spaces provided with a personal property, a space may be shared with at least one of other terminal devices if the user terminal device can perform communication with the other terminal devices. Such features may be referred to as having a public property, sharing property, common property, or social property. This disclosure uniformly refers to such a property as a social property for ease of explanation.

Figure 4:
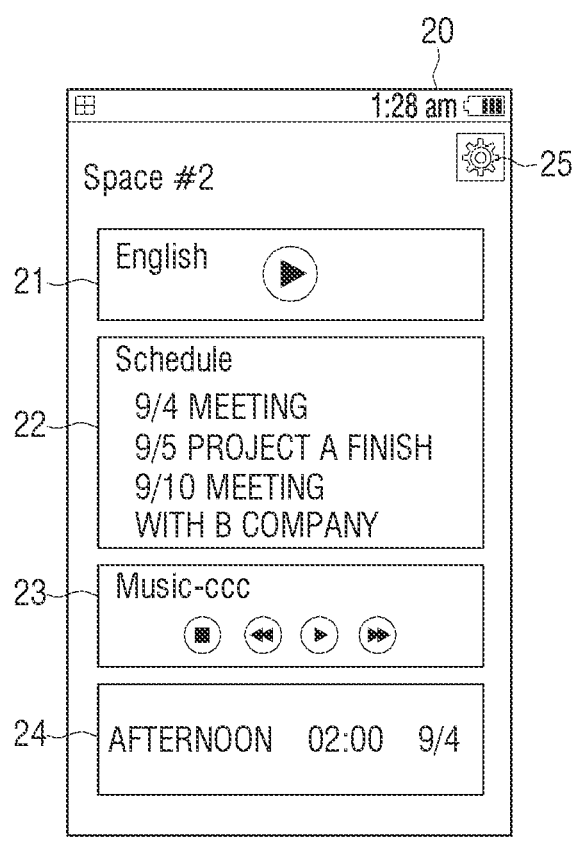
FIG. 4 illustrates an example of constitution of space given with social property according to an embodiment of the present disclosure.

FIG. 4 illustrates an example of a constitution of the space provided with a social property according to an embodiment of the present disclosure.

Referring to FIG. 4, Space #2 20 includes a plurality of panel areas 21~24, and a status information display menu 25. The panel areas 21~24 display widget screens of programs matched with Space #2 20 or implementing screens of the programs. The first panel area 21 displays an implementing screen of the contents playing program, the second panel area 22 displays an implementing screen of a schedule managing program, the third panel area 23 displays an implementing screen of the audio playing program, and the fourth panel area 24 displays the current information widget that displays current information such as time, date, and weather (not shown).

The first panel area 21 and the third panel area 23 are created by the same programs of the first panel area 11 and the third panel area 13 in FIG. 3; however, they display different playing results of contents compared to FIG. 3. Thus, Space #1 10 displays playing results of video contents or audio contents which are personally viewed, while Space #2 20 displays playing results of video contents or audio contents which can be viewed with other users on corresponding panel area 23.

Space #2 20 provided with a social property may be displayed on other user terminal devices. Therefore, when a plurality of users match programs or data installed on their respective user terminal devices with Space #2 20 provided with the social property, each user may use the programs or the data matched by other users.

Meanwhile, when the status information display menu 25 displayed on Space #2 20 is selected, the user terminal device may display a status information screen including names and features of Space #2 20, programs or data matched with Space #2 20, and information regarding sharing users. A more detailed description will follow below.

Figure 5:
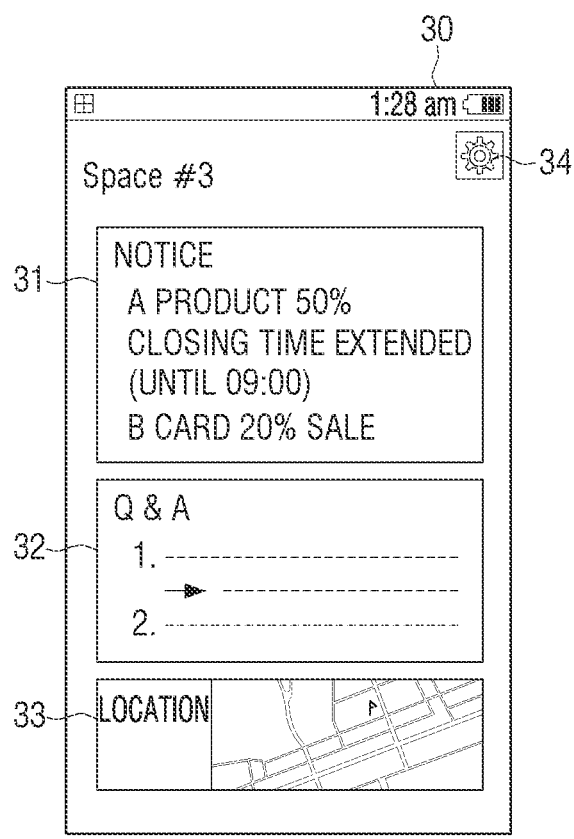
FIG. 5 illustrates an example of a constitution of a space provided with a manager property according to an embodiment of the present disclosure.

FIG. 5 illustrates an example of constitution of the space given with manager property according to an embodiment of the present disclosure.

Referring to FIG. 5, Space #3 30 provided with a manager property displays a plurality of panel areas 31, 32, and 33, and a status information display menu 34. If a widget program is implemented in FIG. 5, a widget area may be also added.

When a manager gives access authorization to a user of the user terminal device 100, Space #3 30 of FIG. 5 may be displayed on the user terminal device. The panel areas 31, 32, and 33 on Space #3 30 may display, for example, a notice that a manager uploads, Questions and Answers (Q&A), or a map screen. A manager may match programs or data that a user can use regarding Space #3 30 so that users can use the programs and data through Space #3 30. Space #3 30 may be commonly created and displayed in user terminal devices of users managed by a same manager.

When the status information display menu 34 is selected on Space #3 30, as illustrated in FIG. 5, the controller 130 controls the screen processor 120 and the display 110 to create and display a status information screen including various information such as manager information related to Space #3 30, and matched programs or data. An example of a status information screen will be described in more detail below.

Although FIGS. 3, 4, and 5 describe that each space is constructed only with implementing screen pages indicating implementing results of corresponding programs to the features, icon display pages may be provided per each space as well as implementing screen pages. As described above, icon display pages may provide implementing screen pages of a corresponding space, i.e., a list of every program that can be used on the log panel or icons. Icon display pages may also provide a delete or add function regarding programs of a corresponding space.

Further, on the spaces illustrated in FIGS. 3, 4, and 5, the panel areas may be established as hidden. A hidden area may be placed on the lowest of the spaces according to frequency of use. The hidden area may be displayed to be dim or to slide so as to be visually distinguished from activating areas, and may alternatively be displayed more than a threshold distance from activating areas, to be distinguished.

FIGS. 6A, 6B, 6C, 6D, 6E, 6F, and 6G are views provided to illustrate a method for converting screens according to an embodiment of the present disclosure, in which implementing screen pages and icon display pages are included per each space.

FIGS. 6A to 6G illustrate situations in which three spaces are provided. Further, FIGS. 6A to 6G illustrate that each space includes implementing screen pages indicating implementing results of programs corresponding to the features, and icon display pages indicating icons of programs corresponding to the features.

FIG. 6A illustrates an implementing screen page 10-A of Space #1 10. FIG. 6D illustrates an icon display page 10-B of Space #1 10. The implementing screen page 10-A displays implementing results of each program. When implementing results of a program cannot be wholly within the implementing screen page 10-A, the page may be scrolled in different directions. The implementing screen page 10-A may further display a screen converting menu 611 and page converting menu 612 as well as panel areas. Although not illustrated, the status information display menu may also be displayed, as illustrated in FIG. 3.

The screen converting menu 611 is menu which converts into an icon screen. When the screen converting menu 611 is selected, the controller 130 controls the screen processor 120 and the display 110 to compose the home screen and display an icon screen 610 which displays various programs or folder icons installed on the user terminal device 100, as illustrated in FIG. 6G.

The page converting menu 612 is a menu which converts into the icon display page 10-B of the same space on the implementing screen page 10-A. Thus, when the page converting menu 612 is selected in FIG. 6A, the controller 130 controls the screen processor 120 and the display 110 to display the icon display page 10-B, as illustrated in FIG. 6D.

Referring to FIG. 6D, the icon display page 10-B displays icons 1, 4, 14, 10, 12, 8, 9, and 7, regarding a plurality of programs matched with Space #1 10. Further, the icon display page 10-B may display the screen converting menu 614, the page converting menu 613, and the status information display menu (not illustrated). When the page converting menu 613 is selected on the icon display page 10-B, the user terminal device 100 displays the implementing screen page 10-A, as illustrated in FIG. 6A. Meanwhile, when the screen converting menu 614 is selected, the icon screen 610 in FIG. 6G is displayed.

When a user touches and flicks the screen toward one direction while displaying the implementing screen page 10-A of Space #1 10, the implementing screen page of a next space is displayed. Further, when a user touches and flicks the screen toward one direction while displaying the icon display page 10-B of Space #1 10, the icon display page of the next space is displayed.

FIG. 6B illustrates converting into an implementing screen page 20-A of Space #2 20 when flicking toward a right direction. The implementing screen page 20-A of Space #2 20 may also display the panel areas, the screen converting menu 621, and the page converting menu 622. When the screen converting menu 621 is selected, the home screen of Space #2 20 completes, and the icon screen 610 of FIG. 6G is displayed. Meanwhile, when the page converting menu 622 is selected, the icon display page 20-B of Space #2 20 is displayed.

The icon display page 20-B of Space #2 displays icons 1, 4, 3, 5 of programs matched with Space #2. Some icons, for example, icons 1 and 4 of the icons, may be matched with the same icons of Space #1 10. Thereby, one program may be matched with a plurality of spaces, and using results of the program on the spaces may be independently managed, as described above. Further, functions of the various menus 623 and 624 displayed on the icon display page 20-B of Space #2 20 are the same as those of Space #1 10, which will not be further described. Meanwhile, when a user flicking manipulation is performed in a right direction again on the implementing screen page 20-A or the icon display page 20-B of Space #2 20, the screen converts into an implementing screen page 30-A or icon display page 30-B of Space #3 30.

The icon display page 30-B of Space #3 30 displays icons, for example, 14, 15, 16, 5, and 4, of programs or folder icons matched with Space #3 30. The icons 5 and 4 are also displayed on the icon display page 20-B of Space #2, among these icons, as illustrated. Further, the implementing screen page 30-A and the icon display page 30-B of Space #3 30 may also display various menus 631, 632, 633, 634, similar to such menus in Space #1 and Space #2. Functions of these menus are already described, and an explanation thereof will not be repeated here.

When the screen converting menus 611, 614, 621, 624, 631, and 634 are selected on various home screens described in FIGS. 6A, A, 6B, 6C, 6D, 6E, and 6F, the user terminal device 100 displays the icon screen 610 illustrated in FIG. 6G. The icon screen 610 displays the icons 1-16 of all the programs and icon folders installed on the user terminal device 100. When it is difficult to display all the icons within one page, the icon screen 610 may include a plurality of pages, and page converting may be performed according to a user's manipulation. FIG. 6 illustrates a plurality of icons arranged in matrix format are included; however, the present disclosure is not limited thereto, and they may be arranged otherwise, for example, in a list format, according to user setting.

A user may select one icon, and match the selected icon with spaces that he chooses, on the icon screen 610 of FIG. 6G. For example, when a user performs a long touch on one icon on the icon screen 610, the screen processor 120 may convert the icon screen into the icon display page included in one space among the plurality of spaces while fixing the selected icon only. Under this status, if it is sensed that a user moves a finger touching the icon right and left, the controller 130 controls the screen processor 120 to modify the icon display page according to the moving direction. When the icon display page that a user wants is displayed, he may lift off the touch status. When it is sensed that touch status is lifted, the controller 130 controls the screen processor 120 to display the corresponding icon on the icon display page. Further, the controller 130 modifies setting values on the storage 140 so that corresponding program to the icon is matched with the space of the icon display page which is newly moved.

When a user selects a newly displayed icon on the icon display page under the above status, implementing results of corresponding program to the selected icon may be displayed on the implementing screen page of corresponding space. Thus, when one icon is selected on the icon display page, the controller 130 implements a corresponding program to the selected icon. Further, the controller 130 controls the screen processor 120 and the display 110 to add and display the implementing results on the implementing screen page.

In summary, the spaces may include various pages. Further, a constitution of each space, functions supported by the spaces, and data that can be used in each space may be arbitrarily modified by a user according to the user's manipulation.

Figure 7:
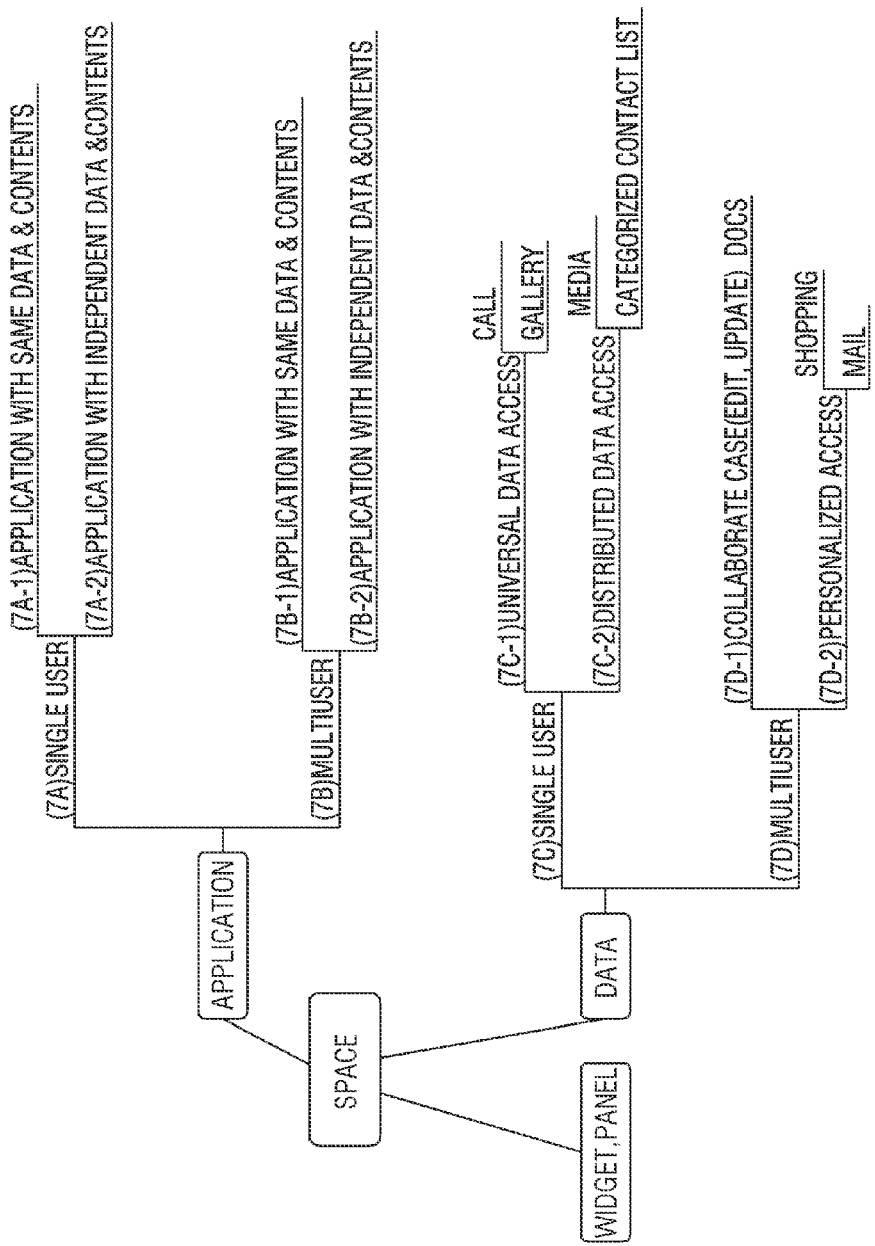
FIG. 7 illustrates an example of classifying and matching programs and data according to an embodiment of the present disclosure.

FIG. 7 is a view provided to illustrate matching relations regarding the stored programs and data in the storage 140 with the spaces according to an embodiment of the present disclosure.

Referring to FIG. 7, application programs stored in the storage 140 may be matched with a space that a single user utilizes (7A) or a space that a plurality of users utilize (7B). If multiple spaces are provided with the personal property that a user utilizes, applications of each space may use uniform data and contents (7A-1) or may use independent data and contents (7A-2). For example, contents may be used at each space by dividing contents viewed at home and contents viewed at office.

When one application is matched with the space that a plurality of users utilize (7B), contents and data used at the space may be shared (7B-1), or only applications may be shared per user terminal device while contents and data may be managed independently (7B-2).

Widgets or other programs may be matched with the spaces according to the same method. Illustrating and explaining regarding the above will not be repeated herein.

Meanwhile, data may similarly be matched with the space that a single user utilizes (7C) or the space that a plurality of users utilize (7D). When a single user utilizes plural spaces, it may be established that corresponding data can be commonly used in each space (7C-1) or it may be established that data can be divided per space and used (7C-2). For example, call data such as telephone numbers or call records and gallery data such as photographing pictures or photographing videos may be commonly used at the plurality of spaces. Meanwhile, media data such as image contents, video contents, or audio contents and a categorized contact list may be divided per space and exclusively used.

Even if data is matched with the space that a plurality of users utilize (7D), data may be accessed, edited, and modified by a plurality of users such as document data (7D-1), or data may be divided to be exclusively accessed and managed by a user such as shopping records or mail descriptions (7D-2).

In the storage 140, matching relations regarding programs and data with the spaces may be arranged and stored in the format of FIG. 7. Based on information stored on the storage 140, the controller 130 may control the screen processor 120 to constitute the home screen. A more detailed description of the controller 130 will be provided below.

Figure 8:
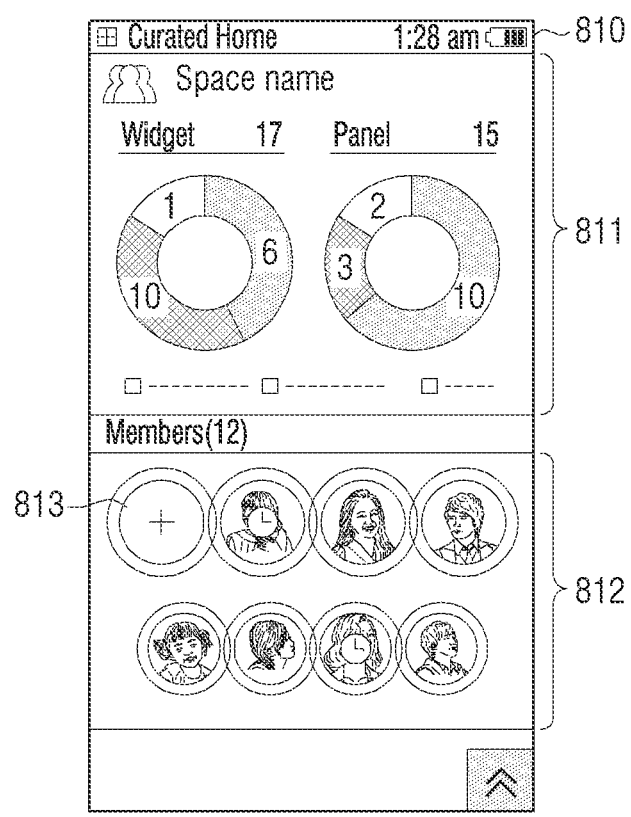
FIG. 8 illustrates a status screen of the space provided with the social property according to an embodiment of the present disclosure.

FIG. 8 illustrates an example of a constitution regarding the status information screen of Space #2 20 provided with a social property according to an embodiment of the present disclosure. When the status information display menu 25 is selected on Space #2 20 of FIG. 4, the status information screen of FIG. 8 may be created and displayed.

Referring to FIG. 8, the status information screen 810 may display program information 811 indicating the number of widgets included in panel areas within an implementing screen page and the number of other panels, and user information 812 indicating information regarding other users.

As described above, a plurality of users can match programs and data on Space #2 20 provided with a social property. Thereby, the program information 811 may display information regarding a number of widgets or panels created by a user of the user terminal device 100, a number of widgets or panels created by other users, and a number of hidden areas. Although the constitution may be displayed in the circle graph format of FIG. 8, the present disclosure is not limited thereto and the display method may be modified variously.

A user may select menu 813 displayed on the user information 812 and add other users. Further, although not illustrated in FIG. 8, a menu to delete users may be also included. When programs are added or users are added, the program information 811 and the user information 812 within the status information screen 810 are updated.

Figure 9:
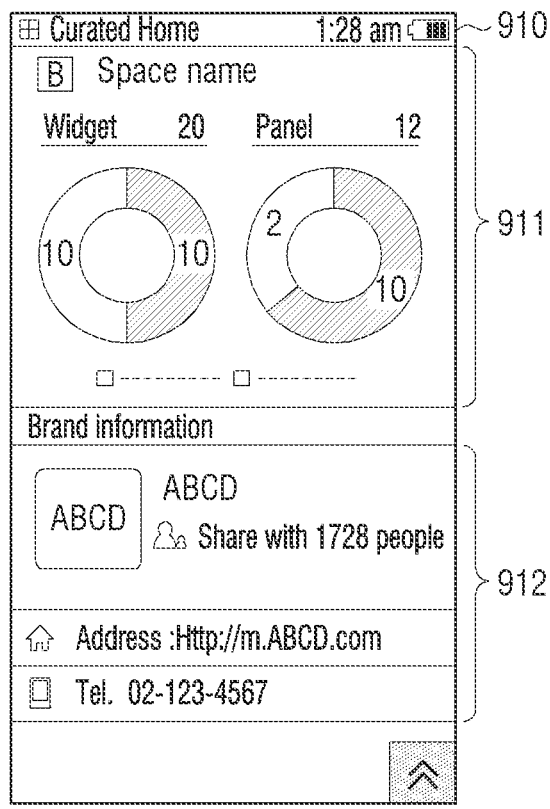
FIG. 9 illustrates a status screen of the space provided with the manager property according to an embodiment of the present disclosure.

FIG. 9 illustrates an example of a constitution regarding status information screen of Space #3 30 provided with a manager property according to an embodiment of the present disclosure. The status information screen of FIG. 9 may be created and displayed when the status information menu 34 is selected on Space #3 30 of FIG. 5.

The status information screen 910 of FIG. 9 may display program information 911 indicating a number of widgets and a number of panels within the implementing screen page and manager information 912 indicating information regarding a manager who manages corresponding spaces.

As described above, on Space #3 30 provided with the manager property, a manager may match programs and data. Thereby, the program information 911 may display the numbers of widgets and other panels created by a manager, and the number of hidden areas, for example, in a circle graph format.

The manager information 912 may display various information, such as information regarding brands owned by a manager, a number of total users provided with access authorization by the same manager, homepage information, a contact address, and an address map.

Meanwhile, widgets or panels displayed on implementing screen pages of each space described above may be edited by a user.

Figure 10:
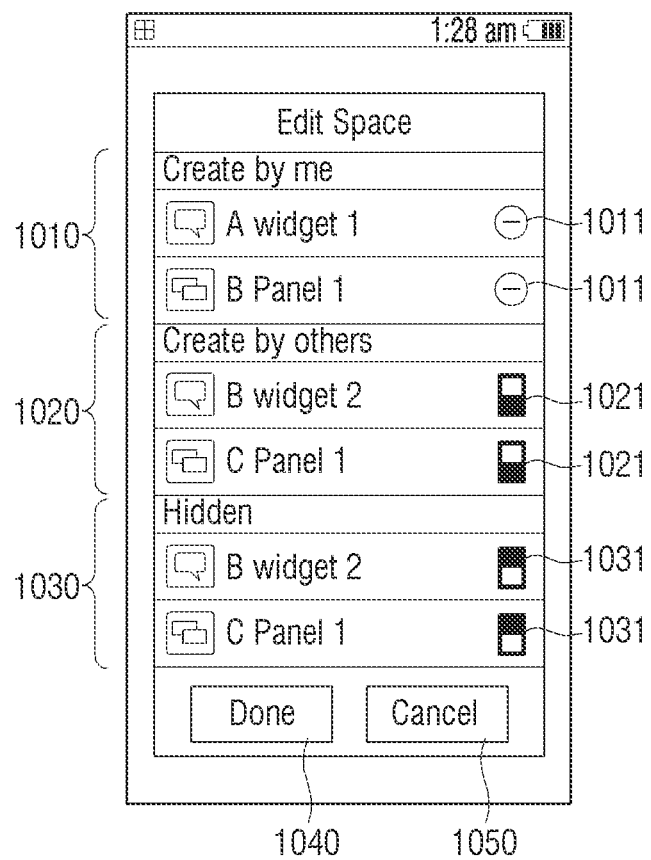
FIG. 10 illustrates an example of editing screen for space editing according to an embodiment of the present disclosure.

FIG. 10 illustrates an example of an editing screen to edit a space constitution according to an embodiment of the present disclosure. Because the space may have various features described above, FIG. 10 illustrates an editing screen regarding the space given with a social property, for an example.

Referring to FIG. 10, the editing screen may display information 1010 regarding widgets or panels created by a user, information 1020 regarding widgets or panels created by other users, information 1030 regarding hidden areas, a complete or 'done' button 1040 to apply the editing status, and a cancel button 1050 to cancel the editing status. When an editing menu displayed on an implementing screen page or an icon display page of a corresponding space is selected, the editing screen of FIG. 10 may be created by the screen processor 120.

The editing screen of FIG. 10 displays information regarding widgets and other panels in text format while displaying a button 1011 to delete a corresponding area, a button 1021 to hide corresponding area, and a button 1031 to lock off the hiding. Because areas created by other users cannot be arbitrarily deleted by a user in FIG. 10, the hide button 1021 is only displayed. The hide lock-off button 1031 is only displayed in FIG. 10 regarding hidden areas. However, these buttons can be displayed regarding all the areas. A position move button to move positions of areas may also be included.

Figure 11:
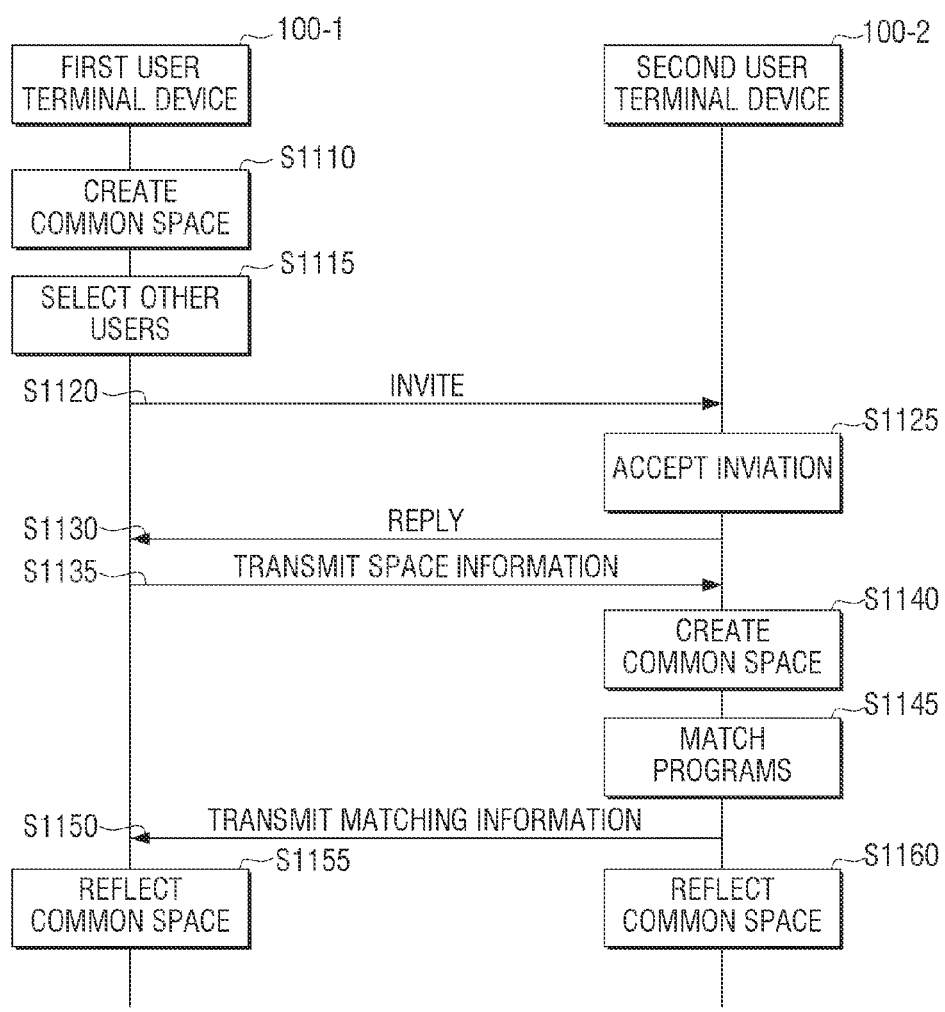
FIG. 11 is a view provided to illustrate an operation to create the space provided with the social property according to an embodiment of the present disclosure.

FIG. 11 is a view provided to illustrate a process of creating a space provided with a social property according to an embodiment of the present disclosure. The first user terminal device 100-1 and the second user terminal device 100-2 may respectively have the constitution of FIG. 1, and display a home screen which is divided into the spaces having various features, as described above.

Under this situation, when the space is provided with the social property in the user terminal device 100-1, i.e., the social space is created at operation S1110, and when other users sharing with a corresponding space are selected at operation S1115, then an invitation message is transmitted to terminal devices of the selected other users at operation S1120. For example, if the status information screen of the social space is constituted as illustrated in FIG. 8, when a user selects the menu 813 within the user information 812, the controller 130 controls the screen processor 120 and the display 110 to create and display a select screen which includes information regarding telephone numbers of other users stored in the user terminal device 100, Internet Protocol (IP) addresses, and other user information provided from a cloud server connected with the user terminal device 100. When a user selects another user on the select screen, the controller 130 transmits an invitation message to the second user terminal device 100-2 of the selected user based on information of the selected user. Although FIG. 11 illustrates that the first user terminal device 100-1 and the second user terminal device 100-2 directly connect communicate, communication may alternatively be connected through an access point or a cloud server.

When the invitation message is received, the second user terminal device 100-2 may display screen indicating the invitation descriptions. A user of the second user terminal device 100-2 may confirm the invitation and accept the invitation at operation S1125. When acceptance of the invitation is performed, the second user terminal device 100-2 transmits a reply message to the first user terminal device 100-1 at operation S1130.

When the reply message is received, the first user terminal device 100-1 transmits information regarding the created social space to the second user terminal device 100-2 at operation S1135. Specifically, information regarding programs and data matched with the social space and information regarding a layout and a title of the social space may be transmitted from the first user terminal device to the second user terminal device 100-2 in operation S1135.

The second user terminal device 100-2 creates the social space based on the received space information at operation S1140. Thereby, the second user terminal device 100-2 may display the social space screen the same as that of the first user terminal device 100-1.

A user of the second user terminal device 100-2 may match programs or data regarding the created social space at operation S1145.

Matching information is transmitted to the first user terminal device 100-1 at operation S1150. The first user terminal device 100-1 updates the social space to reflect the common space by using the received matching information at operation S1155. The second user terminal device 100-2 also updates the social space to reflect the common space at operation S1160.

According to embodiments, the second user terminal device 100-2 may transmit the matched programs or relevant information regarding the programs with the matching information to the first user terminal device 100-1.

Further, the first user terminal device 100-1 may request and receive information regarding the program from the second user terminal device 100-2 when it is determined that the second user terminal device 100-2 matches a program installed in the first user terminal device 100-1 with the social space. Thereby, the first user terminal device 100-1 may display icons on the icon display page of the social space at first. Under the given circumstances, when a user selects an icon, the controller 130 accesses a corresponding source to the selected icon and downloads a corresponding program to the icon. When the downloading is performed, the controller 130 installs a corresponding program in the storage 140. The controller 130 creates a new panel area on the implementing screen page of the social space by implementing the installed program.

With the above method, the first and second user terminal devices 100-1 and 100-2 may respectively display the social space having the uniform constitution. Meanwhile, regarding the chat program, a message input by a chatter chatting with a user may be displayed on one side, and a message input by the user may be displayed on another side. Thus, when the first and second user terminal devices 100-1, 100-2 display a totally uniform format of the space screen, there may be confusion on positions of displaying messages. Thus, the message display position may be determined differently in each of the user terminal devices 100-1 and 100-2.

Figure 12:
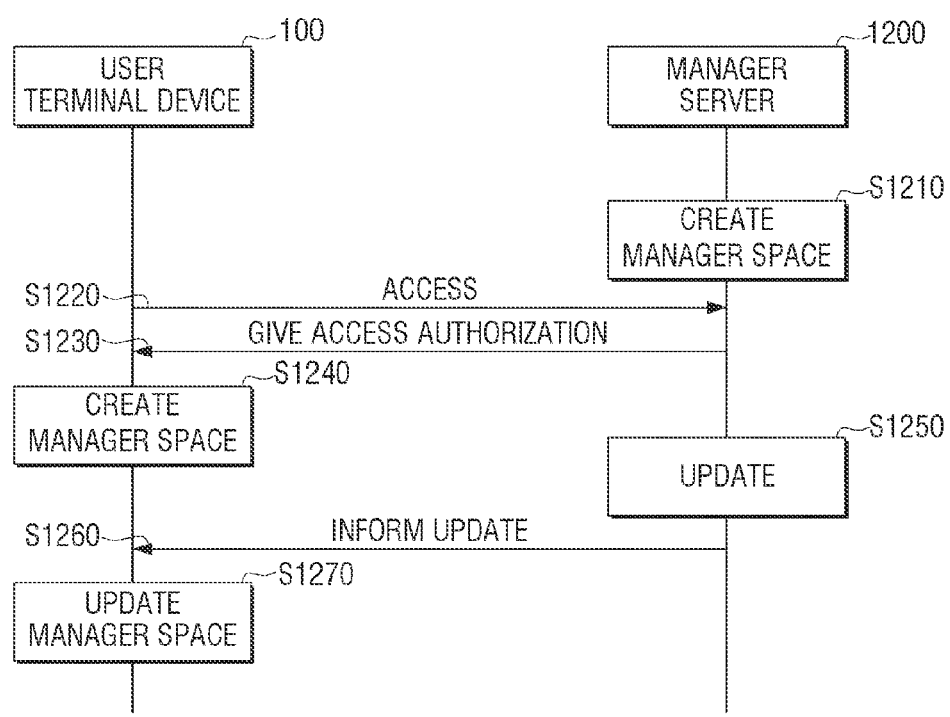
FIG. 12 is a view provided to illustrate an operation to create the space provided with the manager property according to an embodiment of the present disclosure.

FIG. 12 is a view provided to illustrate a process of creating a space provided with a manager property according to an embodiment of the present disclosure.

Referring to FIG. 12, a manager space is created on manager server 1200 at operation S1210. The manager server 1200 may be any of various types of servers such as a shopping mall server, an application store, various brand sites, and various manufacturer servers.

The user terminal device 100 accesses the manager server 1200 by using information regarding a manager at operation S1220. Information regarding a manager may be various information such as a Uniform Resource Locator (URL), IP addresses, or telephone numbers. The user terminal device 100 transmits various user information as well as a user ID to the manager server 1200. A manager of the manager server 1200 gives access authorization to a user of the user terminal device 100 that accesses the manager server at operation S1230. The manager server 1200 also transmits information regarding the manager space as well as access authorization.

The user terminal device 100 creates the manager space based on the received information at operation S1240.

The manager server 1200 may update the manager space by adding programs or data regarding the manager space at operation S1250.

The manager server 1200 informs the updated descriptions of the user terminal device 100 at operation S1260. The user terminal device 100 updates the manager space based on the informed descriptions at operation S1270.

Meanwhile, the space described above may be added or deleted according to a user's selection. Thus, when the user terminal device is launched initially, only the space provided with a personal property may be included in the home screen, or a space provided with a personal property and a space provided with a manager property may be included in the home screen one by one. A user may also select an edit menu and thereby add the space.

Figure 13:
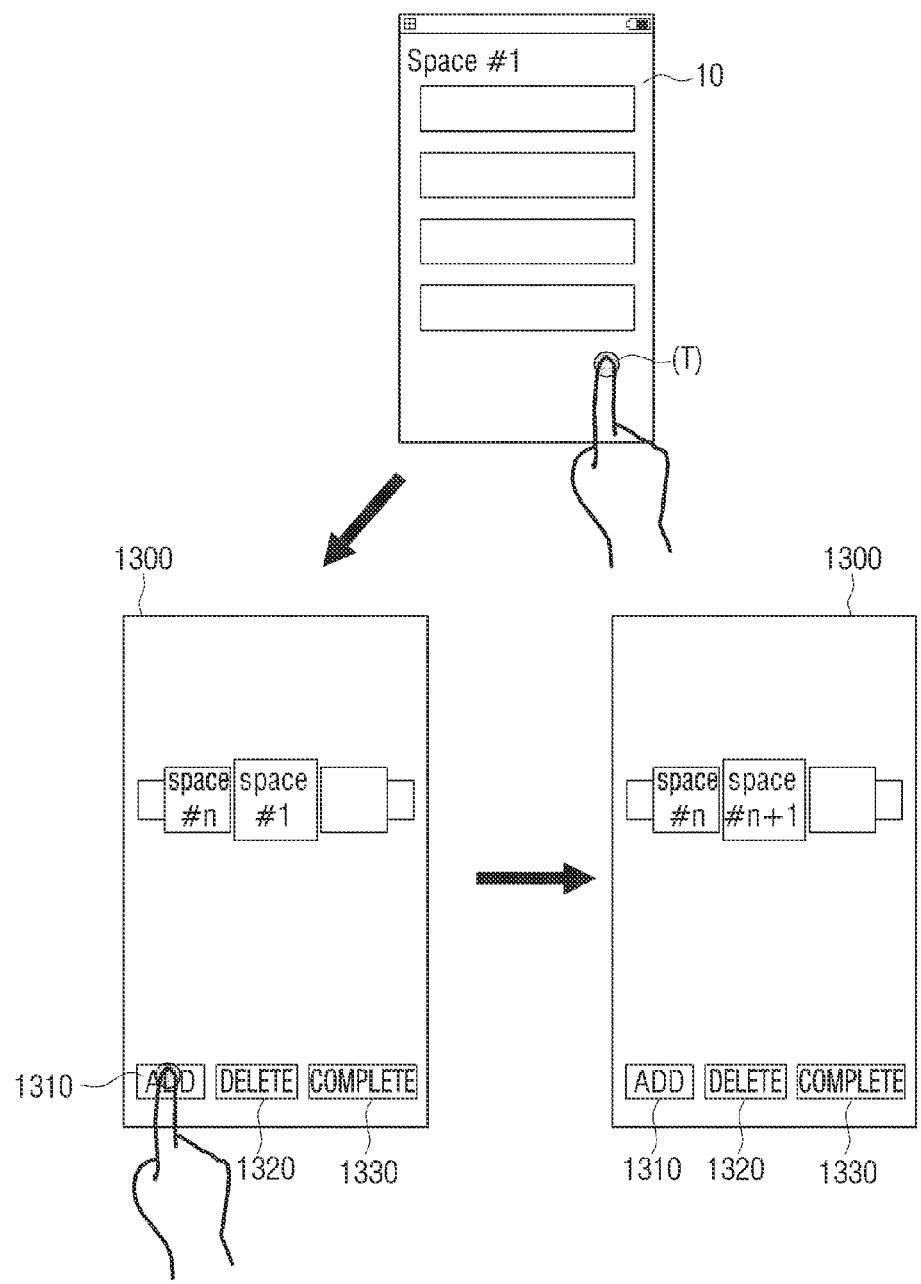
FIG. 13 is a view provided to illustrate an operation to add spaces according to an embodiment of the present disclosure.

FIG. 13 is a view provided to explain an example of a method for adding spaces according to an embodiment of the present disclosure.

FIG. 13 explains with an example of a status in which Space #1 10, i.e., one of the plurality of spaces, is displayed. While displaying Space #1 10, when a user performs a long touch (T) at an arbitrary point on the screen, a space edit screen 1300 which displays images regarding the plurality of spaces is displayed. The space edit screen 1300 displays images of the spaces that are currently created, and also displays a menu 1310 to add spaces, a menu 1320 to delete spaces, and a menu 1330 to complete the space edit screen 1300.

When a user selects the add menu 1310, a new space is created after a Space #n which is a last space among the currently created spaces. Under the given circumstances, when a user selects the complete menu 1330, a setting screen to set features of a new space is displayed. The setting screen may include a select area to select one of the features explained in the above various embodiments and an input area to set a space name.

In summary, according to the various embodiments, the user terminal device may constitute a home screen including the plurality of spaces provided with different features from each other so that a user can arbitrarily modify a constitution of the spaces while separately using programs and data.

Figure 14:
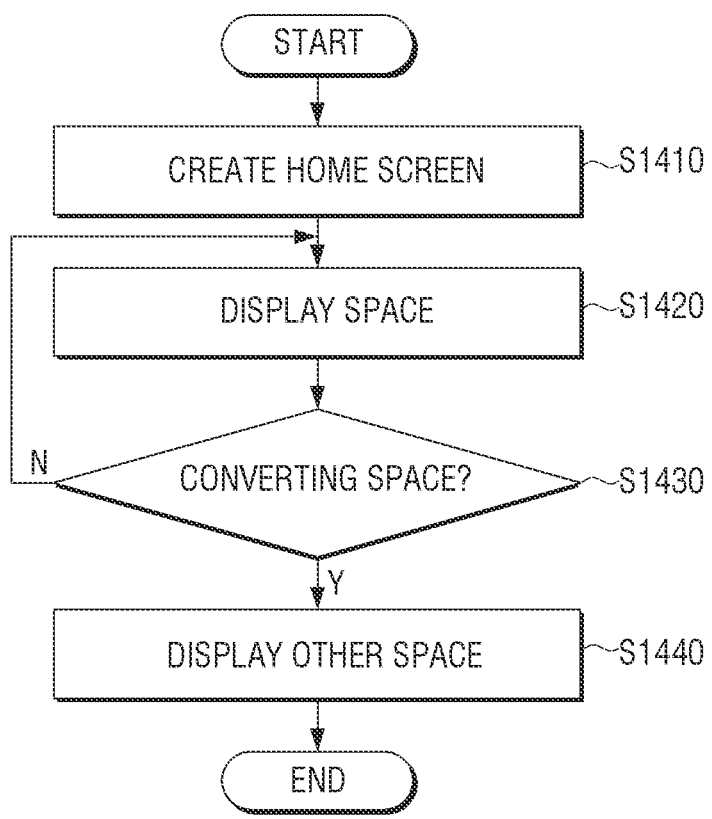
FIG. 14 is a flowchart provided to illustrate a display method of a user terminal device according to an embodiment of the present disclosure.

FIG. 14 is a flowchart provided to illustrate a display method of the user terminal device according to an embodiment of the present disclosure.

Referring to FIG. 14, the user terminal device creates a home screen including a plurality of spaces provided with different features from each other at operation S1410. As described above, the plurality of spaces may include the programs and data matched with each space. Types of features and the method for creating the spaces are already described in the above relevant parts, which will not be repeated here.

The user terminal device displays one space within the home screen at operation S1420 when an event to turn on the user terminal device, an event to perform a lock-off while being locked-on, and event to push the home button while displaying various applications or other screens occur. When being displayed initially, the space established as the default space may be first displayed; however, the space used most recently may be first displayed after that.

When a user inputs a manipulation to convert the spaces while the space is displayed at operation S1430, the user terminal device displays other spaces according to the user's manipulation at operation S1440. The constitution and the converting method of each space are already specifically described above by referring to FIGS. 3, 4, 5, and, 6A, 6B, 6C, D, 6E, 6F, and 6G, which will not be repeated here.

The user terminal device divides setting values and data established regarding corresponding programs to the features of the plurality of spaces in each space according to the corresponding space features, and independently manages the divided values and data. The relevant details are specifically described in the descriptions above of FIG. 7, which will not be repeated here.

When one space is divided into implementing screen pages and icon display pages, as described above, the display method may further include adding a new panel area to the implementing screen page of corresponding space by implementing a corresponding program to the selected icon, when one icon is selected on the icon display pages.

Further, when one program is commonly matched with the plurality of spaces, the display method may further include managing implementing records of programs per each space independently and displaying an implementing screen of each program per each space independently.

The display method illustrated in FIG. 14 may be performed in the user terminal device having constitution of FIG. 1; however, the present disclosure is not limited thereto. For example, the method may be performed in the user terminal device of FIG. 15.

Figure 15:
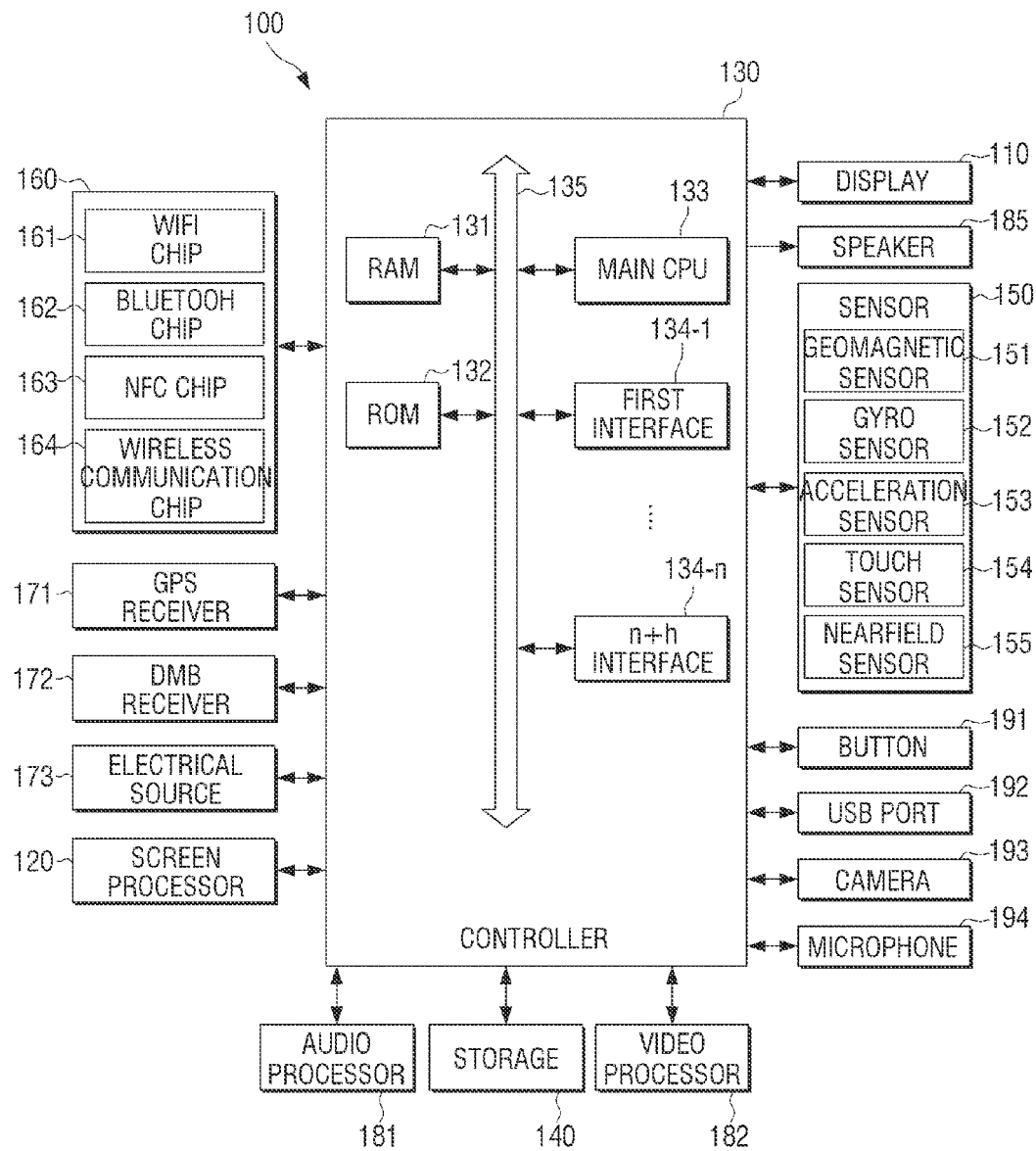
FIG. 15 illustrates a constitution of a user terminal device according to an embodiment of the present disclosure.

FIG. 15 illustrates a constitution of a user terminal device including various units according to an embodiment of the present disclosure.

Referring to FIG. 15, the user terminal device 100 may include the display 110, the screen processor 120, the controller 130, the storage 140, a sensor 150, a communicator 160, a Global Positioning System (GPS) receiver 171, a Digital Multimedia Broadcasting (DMB) receiver 172, an electrical source 173, an audio processor 181, a video processor 182, a speaker 185, a button 191, a Universal Serial Bus (USB) port 192, a camera 193, and a microphone 194.

The display 110 displays a home screen having various constitutions as described above and an icon screen.

The screen processor 120 creates a User Interface (UI) screen including various objects such as icons, images, and texts, by using a calculator (not illustrated) and a renderer (not illustrated). As described above, the UI screen may include various types such as a background screen, an icon display screen, a soft keyboard screen, and a web page screen. Specifically, the screen processor 120 may create the home screen and the icon screen which include the plurality of spaces. Specifically, the calculator calculates feature values such as coordinate values, shape, size, and color, with which each object will be displayed according to layouts of the screens. The renderer generates various layouts of screens including objects based on the calculated feature values in the calculator. The screens generated in the renderer are provided to the display 110 and displayed within the display area.

The controller 130 controls a general operation of the user terminal device 100 by using various programs and data stored in the storage 140. Detailed constitution and operation of the controller 130 and constitution of the storage 140 will be described in more detail below.

The sensor 150 may include various sensors such as a geomagnetic sensor 151, a gyro sensor 152, an acceleration sensor 153, a touch sensor 154, and a nearfield sensor 155. Thereby, the sensor 150 may sense rotating, sliding, pressure, and an approaching of the user terminal device, as well as touches or button manipulations.

The geomagnetic sensor 151 is configured to sense a rotational status and moving direction of the user terminal device 100. The gyro sensor 152 is configured to sense a rotating or changing orientation of the user terminal device 100. The acceleration sensor 153 is configured to sense a tilt or movement of the user terminal device 100. The controller 130 may convert the screen of the display 110 to a horizontal or vertical orientation, or zoom-in and zoom-out the screen of the display 110 according to the sensing results by sensing a movement or rotation of the user terminal device 100 with the geomagnetic sensor 151, the gyro sensor 152, or the acceleration sensor 153.

The touch sensor 154 may be implemented, for example, as a capacitive or resistive type. The capacitive type uses a method to calculate touch coordinate values by using a conductive layer coated on the surface of the display 110 and sensing micro electricity produced on the user's body, when a part of the user's body touches the surface of the display 110. The resistive type uses a method to include two electrode panels and calculate touch coordinate values by sensing electricity flows by contact between upper and lower plates on the touched point when a user touches the screen. Thus, the touch sensor 154 may be implemented in various formats. The controller 130 may determine which object is selected by a user by comparing the touch coordinate values of the touch sensed by the touch sensor 154 with the position coordinate values of objects displayed on the screen of the display 110. Further, the controller 130 may determine whether to perform a long-touch manipulation by counting a time from the time point when the touch starts to the time point when the touch ends. Further, the controller 130 may distinguish various types of touch manipulation such as a simple touch, a touch & drag, and a flick by determining a change, a change direction, and a change velocity in the touch coordinate values. The nearfield sensor 155 is sensor to sense approaching motion without contacting the surface of the display. The nearfield sensor 155 may be implemented as various types of sensors such as a high-frequency oscillator to sense electrical currents induced by characteristics of the magnetic field which is changed when objects approach by forming a high frequency magnetic field, a magnetic sensor to use magnetics, and a capacitive charging sensor to sense a capacitive charging amount changed by the approaching of the objects. Even if a touch is not directly performed, the controller 130 may perform an operation such as a screen converting or a menu selecting according to the approaching when the nearfield sensor 155 senses the approaching of a user. The above sensors of the sensor 150 are optional and may be deleted in whole or in part, or other various types of sensors such as a grip sensor or a pressure sensor may be further included.

The communicator 160 is a unit to perform communication with various types of external devices according to various communication methods. The communicator 160 may include a WiFi chip 161, Bluetooth chip 162, a Near Field Communication (NFC) chip 163, and a wireless communication chip 164.

The WiFi chip 161, Bluetooth chip 162, and NFC chip 163 perform communication respectively according to WiFi, Bluetooth, and NFC standards. Among the chips, the NFC chip 163 is chip operating in a NFC method which uses the 13.56 MHz bandwidth from the various Radio Frequency (RF)-ID frequency bandwidths, such as 136 kilohertz (kHz), 13.56 megahertz (MHz), 433 MHz, 860~960 MHz, and 2.45 gigahertz (GHz). When the WiFi chip 161 or the Bluetooth chip 162 is used, various connecting information such as a Service Set Identifier (SSID) and a session key may be first trans-received, communication is connected by using the received information, and various information and data may then be trans-received. The wireless communication chip 164 is a chip to perform communication according to various communication standards such as established by the Institute of Electrical and Electronics Engineers (IEEE), ZigBee, $3^{rd}$ Generation (3G), the $3^{rd}$ Generation Partnership Project (3GPP), and Long Term Evolution (LTE).

The controller 130 may perform communication with various external devices through the communicator 160. Specifically, the controller 130 may perform communication with terminal devices of other users, a cloud server, and a web server. Through the communicator 160, the controller 130 may upload and download various programs and data. Further, as described above, in order to generate a space provided with a social property or a manager property, the controller 130 may trans-receive information regarding various external devices and the space through the communicator 160. The process to generate the space provided with the social property or the manager property is specifically described above with respect to FIGS. 11 and 12, which will not be repeated here.

The GPS receiver 171 is a unit to receive GPS signals from GPS satellites, and calculates a current position of the user terminal device 100.

The DMB receiver 172 is a unit to receive and process DMB signals.

The electrical source 173 is a unit to provide electrical power to each unit of the user terminal device 100. The electrical source 173 may be implemented to include a positive electrical collector, a positive electrode, electrolytes, a negative electrode, a negative electrical collector, and parts to cover the foregoing units. The electrical source 173 may be implemented to include at least one electrical battery that can be charged and discharged.

The audio processor 181 is a unit to perform processing of audio data included in contents. The audio processor 181 may perform various processing such as decoding, amplifying, or noise filtering regarding audio data.

The video processor 182 is a unit to perform processing of video data included in contents. The video processor 182 may perform various image processing such as decoding, scaling, noise filtering, frame rate converting, and resolution converting regarding video data.

The controller 130 may play corresponding contents by driving the video processor 182 and the audio processor 181 when the playing program regarding multimedia contents is implemented. The display 110 may display image frames generated in the video processor 182. Further, the speaker 185 outputs audio data generated in the audio processor 181. The controller 130 may control the screen processor 120 to capture image frames generated in the video processor 182 and display the captured image frames on the panel areas of the spaces, as described above.

The button 191 may be various types of buttons such as a mechanical button formed on arbitrary area (e.g., a front face, a sectioned side, and a back face on the exterior of the main body of the user terminal device 100), a touch pad, or a wheel. As described above, a single button such as home button may be used, or multiple buttons may be used.

The USB port 192 is a unit to connect external devices or a memory through USB cables.

The camera 193 is unit to photograph still images or video images according to the controlling of a user. The camera 193 may be implemented as multiple cameras, such as a front camera and a back camera.

The microphone 194 is unit to receive user voices or other sounds, and to convert received sounds into audio data. The controller 130 may use user voices input through the microphone 194 while calling, or store received sounds in the storage 140 after converting the sounds into audio data.

When the camera 193 and the microphone 194 are provided, the controller 130 may perform a controlling operation according to user voices input through the microphone 194 or a user motion received by the camera 193 and recognized. Thus, the user terminal device 100 may operate in a motion controlling mode or a voice controlling mode. When operating in the motion controlling mode, the controller 130 photographs a user by activating the camera 193, tracks changes in the user's motion, and performs a corresponding controlling operation according to the motion. When operating in the voice controlling mode, the controller 130 may operate in a voice recognizing mode which analyzes users' voices input through the microphone, and performs a controlling operation according to the analyzed users' voices. In the user terminal device 100 that the motion controlling mode or the voice controlling mode is supported, an operation such as converting between a home screen and an icon screen, space converting within the home screen, and page converting can be performed according to the motion manipulation or the voice manipulation, as well as the touch manipulation of FIG. 6.

Various external input ports to connect various external components such as a headset, a mouse, and a Local Area Network (LAN) may be further included.

The operation of the controller 130 described above may be performed by the program stored in the storage 140. The storage 140 may store programs such as Operating System (O/S) software to drive the user terminal device 100, various applications and widgets, various data input or generated while implementing programs, contents, space information, matching information between spaces and programs, and matching information between spaces and data.

The controller 130 may use various programs stored in the storage 140. The controller 130 may include Random Access Memory (RAM) 131, Read Only Memory (ROM) 132, a main Central Processing Unit (CPU) 133, first to $n^{th}$ interfaces 134-1~134-$n$, and a bus 135. The RAM 131, ROM 132, main CPU 133, and the first to $n^{th}$ interfaces 134-1~134-$n$ may connect with each other through the bus 135.

The first to $n^{th}$ interfaces 134-1~134-$n$ connect the various units described above. One of the interfaces may be a network interface which connects external devices through a network.

The main CPU 133 accesses the storage 140, and performs a booting operation by using the stored O/S in the storage 140. Further, the main CPU 133 performs various operations by using various programs, contents, and data stored in the storage 140.

The ROM 132 stores a set of commands to boot the system. When a command to power on is input and electrical power is provided, the main CPU 133 copies the stored O/S from the storage 140 to the RAM 131 according to the stored commands in the ROM 132, and boots the system by implementing the O/S. When the booting completes, the main CPU 133 copies various programs stored in the storage 140 to RAM 131, and performs various operation by implementing the copied programs on RAM 131. The main CPU 133 may copy and activate the selected programs by a user on RAM 131 among the programs matched with the space, when an event to display one space from the plurality of spaces occurs. The screen processor 130 generates implementing screens or widget screens by the activated programs, and generates space screens by including the generated screens on the panel areas. Thereby, various operations such as space converting, page converting, and screen converting may be performed. The main CPU 133 distinguishes and records data newly added or modified in each space from data of other spaces within the storage 140. Thus, independent data management can be performed per each space.

FIG. 15 illustrates various units that can be provided when the user terminal device 100 is implemented as a cellular phone which supports various functions such as a communicating function, an automatic rotating function, a DMB function, and a GPS function. Thus, according to embodiments, some of the units illustrated in FIG. 15 may optionally be deleted or modified, or other new units may be added.

As described above, the controller 130 may perform various operations by implementing programs stored in the storage 140.

Figure 16:
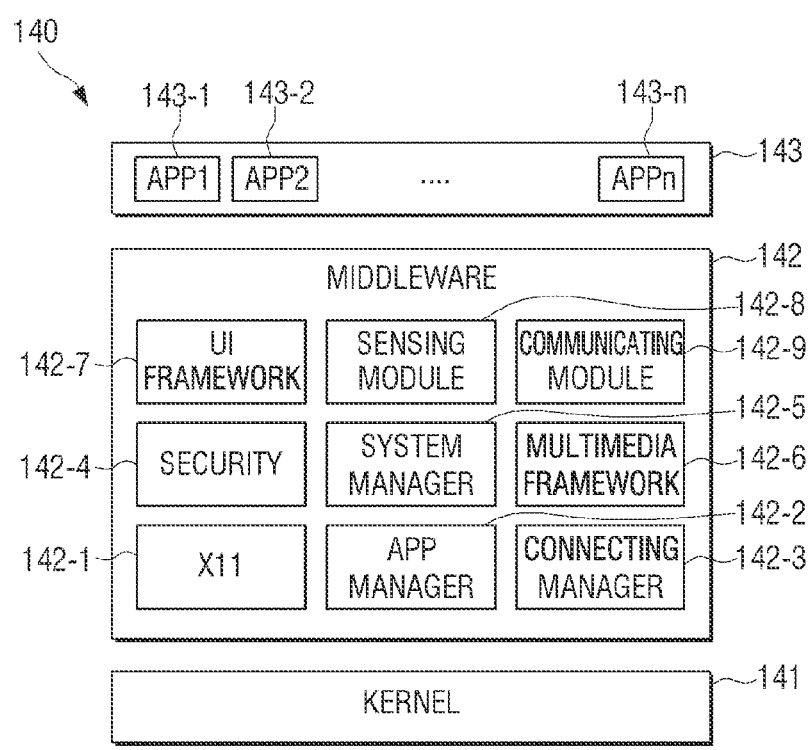
FIG. 16 illustrates a constitution of programs used in the user terminal device of FIG. 15 according to an embodiment of the present disclosure.

FIG. 16 is a view provided to illustrate software architecture stored in the storage 140 according to an embodiment of the present disclosure.

Referring to FIG. 16, the storage 140 stores a kernel 141, middleware 142, and an application module 143.

The kernel 141 plays a routing role to deliver signals input from the various sensors or other hardware included in the sensor 150 to the middleware 142.

The middleware 142 includes various software modules which control operations of the user terminal device 100. Referring to FIG. 16, the middleware 142 may include an X11 module 142-1, an APP manager 142-2, a connecting manager 142-3, a security module 142-4, a system manager 142-5, a multimedia framework 142-6, a UI framework 142-7, a sensing module 142-8, and a communicating module 142-9.

The X11 module 142-1 is a module which receives various events from various hardware provided in the user terminal device 100. Herein, an event may be established variously such as an event to generate system alarms and an event to start or complete implementation of a specific program, as well as an event to sense a touch, a bending, or other user manipulation.

The APP manager 142-2 is module which manages an implementing status of various applications installed in the storage 140. When an event to input an application implementing command from the X11 module 142-2 is sensed, the APP manager 142-2 calls and implements a corresponding application to the event. The APP manager 142-2 may call and implement the application matched with corresponding space, when a specific space is selected and the screen is displayed. The screen according to implementing results of the called application may be provided to the UI framework 142-7 and displayed on the panel area of implementing screen pages.

The connecting manager 142-3 is module which supports connecting via a wired or wireless network. The connecting manager 142-3 may include various sub modules such as a DeviceNet (DNET) module and a Universal Plug-and-Play (UPnP) module.

The security module 142-4 is a module which supports certification, requests permissions, and secures storage regarding hardware.

The system manager 142-5 monitors a status of each unit within the user terminal device 100 and provides the monitoring results to other modules. For example, when a battery remaining power amount is low, errors occur, or communication is disconnected, the system manager 142-5 may provide the monitoring results to UI framework 142-7 and output alarm messages or alarm sounds.

The multimedia framework 142-6 is a module which plays multimedia contents stored in the user terminal device 100 or provided from external sources. The multimedia framework 142-6 may include a player module, a camcorder module, and a sound processing module. When implemented, the above modules may perform playing of various multimedia contents, generating and playing screens and sounds by controlling hardware such as audio processor 181 and video processor 182.

The UI framework 142-7 is a module which provides various UI screens. The UI framework 142-7 may include an image compositor module constituting various image objects, a coordinate compositor module calculating coordinates where the image objects will be displayed, a rendering module rendering the constituted image objects on the calculated coordinates, and a two-dimensional/three-dimensional (2D/3D) UI toolkit providing tools to constitute UI in a 2D or 3D format. As described above, the UI framework 142-7 may generate the home screen such as by implementing screen pages and icon display pages in each space and an icon screen by driving the screen processor 120.

The sensing module 142-8 is configured to analyze sensing results of various sensors as well as the touch sensor 154 and signals input through the button, the microphone, and the camera. When it is determined that an event to modify screens according to the analyzing results occurs, the sensing module 142-8 delivers the event to the UI framework 142-7 and performs a corresponding operation to the event.

The communicating module 142-9 is configured to perform communication with external devices by driving various communication methods included in the communicator 160 of FIG. 15.

The application module 143 includes applications such as application APP1 143-1, application APP2 143-2, to application APPn 143-n to support various functions. For example, it may include program modules to provide various services such as a navigation program module, a game module, an electronic book module, a calendar module, and an alarm managing module.

FIG. 16 merely illustrates one example of constitution of the programs stored in the storage 140; the constitution of the programs can be variously modified. For example, the storage 140 may provide a sensing module to analyze sensing signals in the various sensors, a messaging module such as a messenger program, a Short Message Service (SMS) & Multimedia Message Service (MMS) program, an e-mail program, a call info aggregator program module, a Voice over IP (VoIP) module, and a web browser module.

In summary, according to the various embodiments, a user may divide and use a home screen of the user terminal device 100 into a plurality of spaces according to various criteria such as a life style or interests. Therefore, because programs or data associated with each space can be distinguished and used accordingly, a personalized home screen for a particular user can be constituted. Further, parts that can be shared with other users may be shared by generating other separate spaces, and spaces created by a manager may be displayed in order to use various information provided from the manager, i.e., a third party. In each space, as well as information regarding programs or data that can used in the space, usage records of the program and the data, i.e., logging information can be confirmed. As a result, user convenience in using the home screen may be maximized.

The display method according to the above various embodiments may be coded as software stored on a non-transitory computer readable recording medium. Such a non-transitory computer readable recording medium may support implementing of the above display method in corresponding devices by being connected or mounted on various types of user terminal devices, as described above.

The non-transitory computer readable recording medium indicates a medium which stores data at least semi-permanently and can be read by devices. Specifically, the above various applications or programs may be stored and provided in non-transitory computer readable recording media such as a Compact Disc (CD), a Digital Versatile Disc (DVD), a hard disk, a Blu-ray disk, a USB device, a memory card, or ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A user terminal device, the device comprising:
a transceiver configured to receive data from at least one of a first source and a second source;
a display; and
at least one processor configured to:
when the data is received from the first source, determine the data is associated with the first source and extract first content from the data, when the data is received from the second source, determine the data is associated with the second source and extract second content from the data, in response to receiving a first command while displaying a first space comprising a widget including the first content, control the display to display a second space comprising the widget including the second content, and in response to receiving a second command while one of the first and second spaces is displayed, control the display to display an icon display page comprising an icon corresponding to the widget included in the displayed space, wherein the widget included in the first space is only controlled by the user terminal device and the widget included in the second space is shared with another user terminal device and controlled by both the user terminal device and the other user terminal device.

2. The device of claim 1, wherein the at least one processor is further configured to divide and independently manage setting values according to features of each of the plurality of spaces.

3. The device of claim 2,
wherein the respective space comprises an implementing screen page, and
wherein the implementing screen page comprises at least one panel area comprising the widget.

4. The device of claim 3, wherein, when an icon is selected on the icon display page, the at least one processor is further configured to add a new panel area to the implementing screen page by implementing a widget of a program corresponding to the selected icon.

5. The device of claim 3,
wherein the implementing screen page and the icon display page each comprise a page converting menu, and
wherein, when the page converting menu is selected while the icon display page is displayed, the at least one processor is further configured to control the display to display the implementing screen page.

6. The device of claim 5, wherein, when the page converting menu is selected while the implementing screen page is displayed, the at least one processor is further configured to receive the second command.

7. The device of claim 6, wherein, when an icon is selected within the icon display page and a user manipulation is input to match the icon with the respective space, the at least one processor is further configured to display the selected icon on the icon display page.

8. The device of claim 2, wherein the features comprise at least one of a personal property associated with a particular user of the device, a social property associated with at least two users, and a manager property which is managed by a designated manager.

9. The device of claim 3, wherein the features comprise at least one of a personal property associated with a particular user of the device, a social property associated with at least two users, and a manager property which is managed by a designated manager,
wherein the at least one processor is further configured to:
display an implementing screen of a program that is matched with the social property and an implementing screen of a program that is provided from at least one other user, and
display an icon of a program matched with the respective space provided with the social property and an icon of a program provided from at least one other user on the icon display pages of the respective space associated with the social property.

10. A display method of a user terminal device, the method comprising:
receiving data from at least one of a first source and a second source;
when the data is received from the first source, determine the data is associated with the first space and extracting first content from the data;
when the data is received from the second source, determine the data is associated with the second space and extracting second content from the data;
in response to receiving a first command while displaying a first space comprising a widget including the first content, displaying a second space comprising the widget including the second content; and
in response to receiving a second command while a respective space among one of the first and second spaces is displayed, displaying an icon display page comprising an icon corresponding to the widget included in the displayed space,
wherein the widget included in the first space is only controlled by the user terminal device and the widget included in the second space is shared with another user terminal device and controlled by both the user terminal device and the other user terminal device.

11. The method of claim 10, further comprising individually managing setting values according to features of each of the plurality of spaces.

12. The method of claim 11,
wherein the respective space comprises an implementing screen page and, and
wherein the implementing screen page displays at least one panel area comprising the widget.

13. The method of claim 12, further comprising:
when an icon is selected on the icon display page, adding a new panel area to the implementing screen page by implementing a program corresponding to the selected icon.

14. The method of claim 12, further comprising, when a page converting menu is selected while the icon display page is displayed, displaying the implementing screen page.

15. The method of claim 14, further comprising, when the page converting menu is selected while the implementing screen page is displayed, receiving the second command.

16. The method of claim 15, further comprising:
when an icon is selected within the icon display page and a user manipulation is input to match the icon with the respective space, displaying the selected icon on the icon display page.

17. The method of claim 11, wherein the features comprise at least one of a personal property associated with a particular user of the device, a social property associated with at least two users, and a manager property which is managed by a designated manager.

18. The method of claim 12,
wherein the features comprise at least one of a personal property associated with a particular user of the device, a social property associated with at least two users, and a manager property which is managed by a designated manager,
wherein an implementing screen page of a space provided with the social property displays an implementing screen of a program that is matched with the social property and an implementing screen of a program that is provided from at least one other user, and wherein an icon display page of the respective space provided with the social property displays an icon of a program that is matched with the respective space associated with the social property and an icon of a program provided from at least one other user.

* * * * *